United States Patent
Gupte et al.

(10) Patent No.: US 9,948,938 B2
(45) Date of Patent: Apr. 17, 2018

(54) METHODS AND SYSTEMS FOR CHROMA RESIDUAL DATA PREDICTION

(75) Inventors: Ajit Deepak Gupte, Bangalore (IN); Ranga Ramanujam Srinivasan, Villupuram (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 639 days.

(21) Appl. No.: 13/553,873

(22) Filed: Jul. 20, 2012

(65) Prior Publication Data

US 2013/0022120 A1 Jan. 24, 2013

(30) Foreign Application Priority Data

Jul. 21, 2011 (IN) .......................... 2504/CHE/2011

(51) Int. Cl.
| | |
|---|---|
| H04N 7/32 | (2006.01) |
| H04N 19/186 | (2014.01) |
| H04N 19/176 | (2014.01) |
| H04N 19/147 | (2014.01) |
| H04N 19/107 | (2014.01) |

(52) U.S. Cl.
CPC ......... H04N 19/186 (2014.11); H04N 19/107 (2014.11); H04N 19/147 (2014.11); H04N 19/176 (2014.11)

(58) Field of Classification Search
None
See application file for complete search history.

(56) References Cited

U.S. PATENT DOCUMENTS

| | | | | |
|---|---|---|---|---|
| 9,008,174 | B2 * | 4/2015 | Zheng ................. | H04N 19/105 375/240.12 |
| 2007/0092001 | A1 * | 4/2007 | Arakawa ................. | 375/240.03 |
| 2007/0154087 | A1 * | 7/2007 | Cho et al. ..................... | 382/166 |
| 2007/0253484 | A1 * | 11/2007 | Zhao et al. .............. | 375/240.13 |
| 2008/0144723 | A1 * | 6/2008 | Chen et al. .............. | 375/240.26 |
| 2008/0152000 | A1 * | 6/2008 | Kaushik ................. | 375/240.03 |
| 2008/0175495 | A1 * | 7/2008 | Segall ........................... | 382/238 |
| 2010/0188571 | A1 * | 7/2010 | Wei Yin ...................... | 348/453 |
| 2010/0329342 | A1 * | 12/2010 | Joshi et al. .............. | 375/240.16 |
| 2011/0255591 | A1 * | 10/2011 | Kim ..................... | H04N 19/107 375/240.02 |
| 2011/0274170 | A1 * | 11/2011 | Paz ...................... | H04N 19/176 375/240.13 |

(Continued)

OTHER PUBLICATIONS

Over Kim et al., "New intra chroma prediction using inter-channel correlation", JCT-VC of ITU-T SG16 WP3, Jul. 21-28, 2010.*

(Continued)

Primary Examiner — Mohammad J Rahman
(74) Attorney, Agent, or Firm — Gregory J. Albin; Charles A. Brill; Frank D. Cimino

(57) ABSTRACT

Several methods and systems for chroma residual data prediction for encoding blocks corresponding to video data are disclosed. In an embodiment, at least one coefficient correlating reconstructed luma residual samples and corresponding reconstructed chroma residual samples is computed for one or more encoded blocks of video data. Predicted chroma residual samples are generated for encoding a block of video data based on corresponding reconstructed luma residual samples and the at least one coefficient.

25 Claims, 5 Drawing Sheets

FIG. 5

(56) References Cited

U.S. PATENT DOCUMENTS

2012/0027083 A1\* 2/2012 Narroschke ............ H04N 19/70
                                                                         375/240.03
2013/0113880 A1\* 5/2013 Zhao ...................... H04N 19/70
                                                                          348/43
2013/0336591 A1\* 12/2013 Jeon et al. .................... 382/238

OTHER PUBLICATIONS

Chen et al., "CE6.a: Chroma intra prediction by reconstructed luma samples", JCT-VC of ITU-T SG16 WP3, Jan. 20-28, 2011.\*
Lucas et al., "Intra-Prediction for Color Image Coding Using YUV Correlation", International Conference on Image Processing, Sep. 26-29, 2010.\*

\* cited by examiner

METHODS AND SYSTEMS FOR CHROMA RESIDUAL DATA PREDICTION

CROSS REFERENCE TO RELATED APPLICATIONS

This application claims the benefit of provisional patent application number 2504/CHE/2011, filed on Jul. 21, 2011, in the Indian Patent Office, which is incorporated herein by reference in its entirety.

TECHNICAL FIELD

The present disclosure generally relates to the field of encoding and decoding of video data.

BACKGROUND

Pursuant to an exemplary scenario, video data captured by media capture devices, such as, for example, a camera or a camcorder, may be compressed in order to save memory during storage or to efficiently utilize the available bandwidth during a transmission. The video data may be encoded utilizing encoding mechanisms that are sufficient to achieve compression of the video data. The video data may subsequently be decompressed (for example, decoded) for display/viewing purposes.

Moreover, in an exemplary scenario, various video encoding paradigms suggest a block-based encoding of video data, where each frame of video data is represented in terms of a plurality of blocks. For encoding blocks of video data, a prediction based on previously encoded blocks of video data, either from a current frame (for example, an intra prediction coding scheme) or from other frames that have already been encoded (for example, an inter prediction coding scheme) may be obtained and subtracted from the current block for generating a residual data. The residual data may be generated for luminance and chrominance components corresponding to the block of video data. The generated residual data may be encoded for facilitating compression of video data.

SUMMARY

Various methods, systems and computer-readable mediums for chroma residual data prediction are disclosed. In an embodiment, a method for chroma residual data prediction is provided. The method includes computing at least one coefficient correlating reconstructed luma residual samples and corresponding reconstructed chroma residual samples for one or more encoded blocks of video data. The method further includes generating predicted chroma residual samples for encoding a block of video data based on corresponding reconstructed luma residual samples and the at least one coefficient. In an embodiment, the block of video data is configured to be encoded based on an inter-prediction coding scheme. In an embodiment, chroma residual error samples are generated by subtracting the predicted chroma residual samples from chroma residual samples corresponding to the block of video data.

In an embodiment, a cost associated with the chroma residual error samples is compared with a cost associated with the chroma residual samples for the block of video data. A chroma residual prediction mode is selected if the cost associated with the chroma residual error samples is less than the cost associated with the chroma residual samples. In an embodiment, the encoding of the block of video data is performed based on the chroma residual error samples on selection of the chroma residual prediction mode. A chroma prediction mode is selected if the cost associated with the chroma residual samples is less than or equal to the cost associated with the chroma residual error samples. In an embodiment, the encoding of the block of video data is performed based on the chroma residual samples on selection of the chroma prediction mode.

In an embodiment, the reconstructed luma residual samples corresponding to the block of video data are subsampled prior to generating the predicted chroma residual samples if a number of reconstructed luma residual samples is greater than a number of chroma residual samples. In an embodiment, the subsampling is performed based on a pre-defined chroma subsampling metric. In an embodiment, the at least one coefficient corresponds to a linear model coefficient obtained based on least mean square error metric. In an embodiment, the predicted chroma residual samples are generated for one of $C_b$ and $C_r$ chroma components corresponding to the block of video data. In an embodiment, the predicted chroma residual samples are generated for remaining of the $C_b$ and $C_r$ chroma components based on the reconstructed luma residual samples and the predicted chroma residual samples generated for one of the $C_b$ and $C_r$ chroma components.

Additionally, in an embodiment, a system for chroma residual data prediction is disclosed. The system includes a processing module and a coding module. The processing module is configured to compute at least one coefficient correlating reconstructed luma residual samples and corresponding reconstructed chroma residual samples for one or more encoded blocks of video data. The coding module is communicatively associated with the processing module and is configured to generate predicted chroma residual samples for encoding a block of video data based on corresponding reconstructed luma residual samples and the at least one coefficient.

Moreover, in an embodiment, a computer-readable medium for chroma data residual prediction is disclosed. The computer-readable medium stores a set of instructions that when executed cause a computer to perform a method for chroma residual data prediction. The method includes computing at least one coefficient correlating reconstructed luma residual samples and corresponding reconstructed chroma residual samples for one or more encoded blocks of video data. The method further includes generating predicted chroma residual samples for encoding a block of video data based on corresponding reconstructed luma residual samples and the at least one coefficient.

DETAILED DESCRIPTION

In an exemplary scenario, various video encoding paradigms suggest a block-based encoding of video data, where each frame of video data is represented in terms of a plurality of blocks. For encoding each block of video data, a prediction based on previously encoded blocks of video data, either from a current frame (for example, an intra prediction coding scheme) or from other frames that have already been encoded (for example, an inter prediction coding scheme) may be obtained and subtracted from the current block for generating residual data. The residual data may be generated for luminance and chrominance components corresponding to the block of video data. The generated residual data may be encoded for facilitating compression of video data. Simplified overviews of encoding and decoding processes are explained herein with reference to FIGS. 1A and 1B.

Figure 1A:
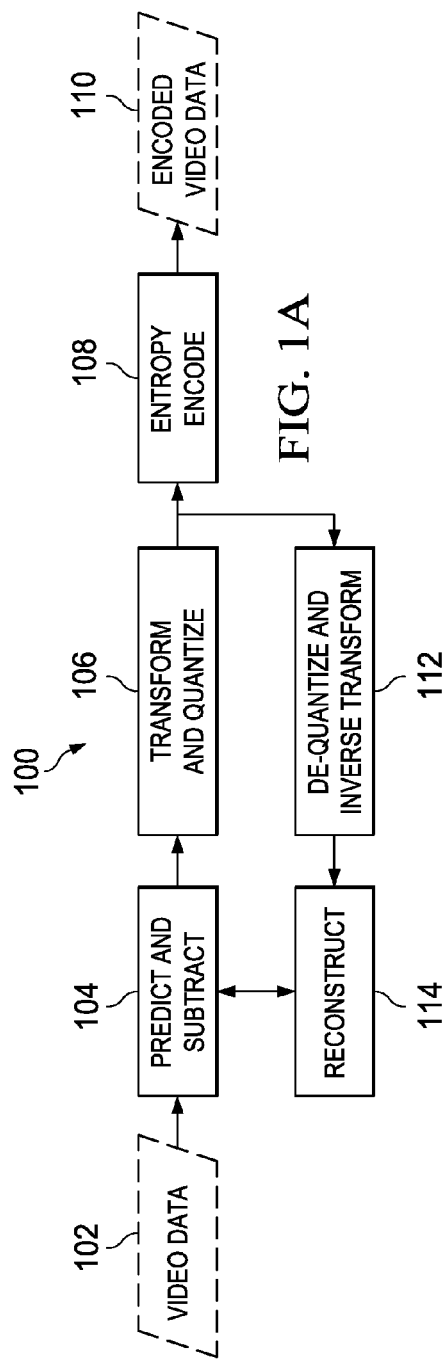
FIGS. 1A and 1B illustrate simplified overviews of exemplary processes for encoding and decoding video data in accordance with an exemplary scenario.
Figure 1B:
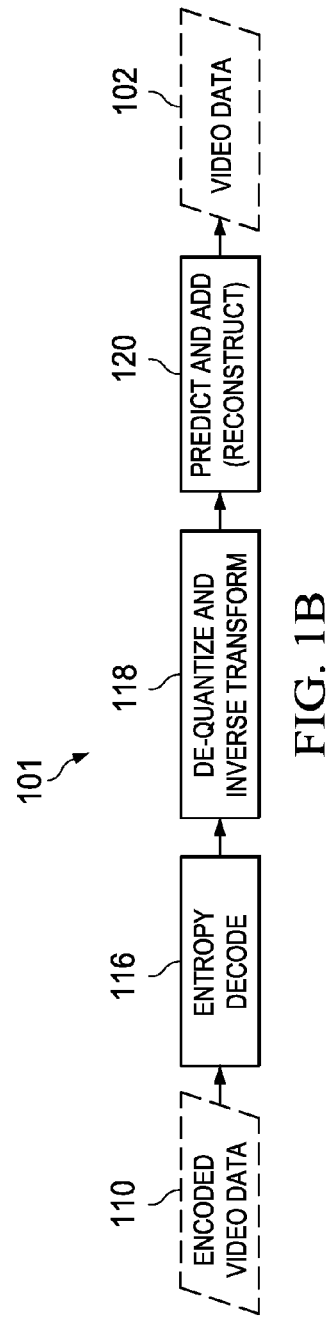

FIGS. 1A and 1B illustrate simplified overviews of exemplary processes for encoding and decoding multimedia data (for example, video data 102), respectively, in accordance with an exemplary scenario. In particular, FIG. 1A illustrates a simplified overview of an encoding process flow 100 for encoding video data 102. Pursuant to an exemplary scenario, a video encoder may perform the encoding process flow 100 in order to achieve the compression of the video data 102. The video data 102 may be compressed so as to efficiently utilize a storage capacity during storage or a spectrum/bandwidth during a transmission.

The video encoder may be configured within a multimedia system. Examples of the multimedia system may include, but are not limited to: (1) multimedia devices, such as, for example, cellular phones, digital video cameras and digital camcorders; (2) data processing devices, such as, for example, personal computers, laptops and personal digital assistants; and (3) consumer electronics, such as, for example, set top boxes, digital video disk (DVD) players and video network servers. Pursuant to an exemplary scenario, the video encoder may be any machine capable of executing a set of instructions (sequential and/or otherwise) so as to perform an encoding of video data 102.

The video data 102 may be received by the video encoder from a media capture device. Examples of the media capture device may include a video camera or a camcorder. The media capture device may be, for example, a stand-alone device or a part of a mobile device, such as, for example, a Smartphone, or a data processing device, such as, for example, a personal computer, a laptop device or a personal digital assistant (PDA). The video data 102 may also be received by the video encoder from a transcoding system (which may be implemented, for example, in any of hardware, software and/or firmware), which may be a stand-alone device or a part of the media capture device.

Pursuant to an exemplary scenario, the video data 102 may include a sequence of video frames, and each frame from among the sequence of frames may include a plurality of blocks (for example, 4×4 block of pixels, 16×16 block of pixels and the like) of video data 102. At 104 of the encoding process flow 100, a prediction for each block from among the plurality of blocks of video data 102 is determined and subtracted from a current block being encoded in order to form residual data. The prediction for each block of video data 102 may be performed based on previously encoded blocks of video data 102, either from a current frame (for example, an intra prediction coding scheme) or from other frames that have already been encoded and transmitted (for example, an inter prediction coding scheme). The prediction for each block of video data 102 may be subtracted from the corresponding block to generate residual data corresponding to the each block.

After prediction and subtraction, at 106, the residual data is transformed (for example, from a spatial domain to a frequency domain) and quantized. The transformation of the residual data outputs a set of transform coefficients, each of which is a weighting value for a preselected basis pattern. The weighted basis pattern, when combined, is capable of recreating the residual data. The set of transform coefficients are then quantized (such as where each coefficient is scaled according to a scale-down factor, which may be a mathematical reciprocal of the scale-up factor specified by a video coding paradigm, effectively setting a number of transform coefficients to a small value (including zero value)) so as to achieve compression.

The quantized transform coefficients, along with certain information (such as, for example, information pertaining to the structure of compressed video data, information about a complete sequence of video data 102 and/or information that enables a decoder to re-create the prediction), are subjected to entropy encoding (for example, conversion into binary codes using variable length coding and/or arithmetic coding) at 108. The entropy encoding of the video data 102 produces an efficient, compact binary representation of the information in the form of encoded video data 110.

The encoding process flow 100 further includes a reverse path for enabling a prediction for subsequent blocks of video data 102. The reverse path includes de-quantization of the quantized video data and inverse transformation of de-quantized video data. At 112, the quantized transform coefficients may be de-quantized (for example, scaled corresponding to a scale-up factor, which may be, in an exemplary embodiment, a value specified by a video coding paradigm) and then inversely transformed (for example, from a frequency domain to a spatial domain) in order to obtain the inversely transformed video data. The inversely transformed video data may be obtained in the form of reconstructed residual samples. The video data 102 may be reconstructed from the reconstructed residual samples at 114 by adding the prediction obtained at 104 to the reconstructed residual samples. The reconstructed video data may be utilized to enable a prediction of subsequent blocks of video data 102.

FIG. 1B illustrates a simplified overview of a decoding process flow 101 for decoding encoded video data 110. Pursuant to an exemplary scenario, a video decoder may perform the decoding process flow 101 in order to achieve the decompression of the video data 102. The video decoder may be configured within a multimedia system, such as, for example, the multimedia system of FIG. 1A. At 116, the encoded video data 110 may be entropy decoded (for example, converted from the binary form, first into intermediate symbols and thereafter into quantized transform coefficients along with the decoding of other encoded information). At 118, the quantized transform coefficients may be de-quantized (for example, scaled according to a scale-up factor, which may be, in an exemplary embodiment, a value specified by a video coding paradigm) and then inversely transformed to obtain the reconstructed residual data. The video data 102 may be reconstructed from the reconstructed residual samples at 120 by adding the prediction (for example, the prediction obtained at 104 of FIG. 1A) to the reconstructed residual samples. The reconstructed video data 102 may then be displayed for viewing purposes.

In an embodiment, the encoding process flow 100 and the decoding process flow 101 as outlined in FIGS. 1A and 1B form the core of video encoder and decoder systems, respectively. It should be noted that various exemplary video coding paradigms might provide specifications for the implementation of the process flow for decoding, such as, for example, the decoding process flow 101. However, the implementation of the process flow for encoding, such as, for example, the encoding process flow 100, though not specified by various video coding paradigms, may be constructed by inversely mirroring the process flow for decoding, such as that outlined by decoding process flow 101 in FIG. 1B. Further, it is noted that the encoding process flow 100 and the decoding process flow 101 may include additional steps or may skip certain steps as outlined in FIGS. 1A and 1B for purposes of encoding and decoding of video data, respectively.

The encoding and decoding process flows 100 and 101 as outlined in FIGS. 1A and 1B suggest encoding of residual data for facilitating compression of blocks of video data. As explained, the residual data is obtained by subtracting a prediction of samples from samples corresponding to a block of video data. In the absence of effective prediction, an energy associated with residual samples may increase thereby adversely affecting compression and a peak signal to noise ratio (PSNR) associated with the video data. Various embodiments of the present technology, however, provide methods, systems, and computer-readable mediums that are configured to provide effective prediction and that are capable of overcoming these and other obstacles and providing additional benefits. The methods, systems and computer readable medium suggest techniques for predicting chroma residual samples from reconstructed luma residual samples. The predicted chroma residual samples may be subtracted from chroma residual samples to obtain chroma residual error samples, which may then be encoded, thereby increasing effectiveness of prediction and of subsequent encoding/decoding of video data. Furthermore, an exemplary application of the chroma residual prediction for inter-prediction coding scheme is also explored. An exemplary system for chroma residual prediction in video data is described herein with reference to FIG. 2.

Figure 2:
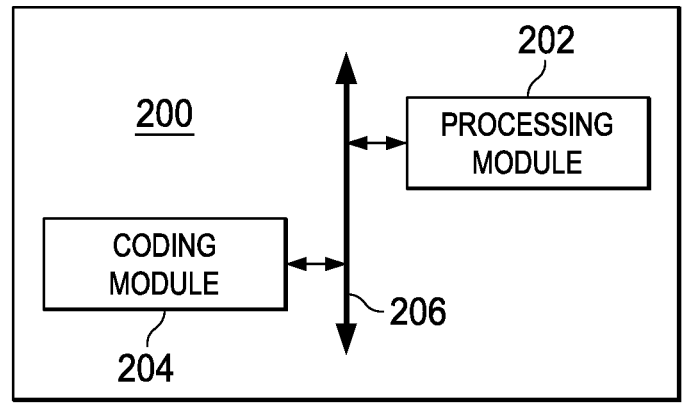
FIG. 2 is a block diagram of an exemplary system for chroma residual data prediction in accordance with an embodiment.

FIG. 2 is a block diagram of an exemplary system 200 for chroma residual data prediction in accordance with an embodiment. In an embodiment, the system 200 may be configured to be included within a video encoder/decoder. In an embodiment, the video encoder/decoder may be configured within a multimedia system. Examples of the multimedia system may include, but are not limited to: (1) multimedia devices, such as, for example, cellular phones, digital video cameras and digital camcorders; (2) data processing devices, such as, for example, personal computers, laptops and personal digital assistants; and (3) consumer electronics, such as, for example, set top boxes, digital video disk (DVD) players and video network servers. Pursuant to an exemplary scenario, the video encoder/decoder may be any machine capable of executing a set of instructions (sequential and/or otherwise) so as to perform an encoding and decoding of video data 102. In an embodiment, the system 200 may be one of a high efficiency video coding (HEVC) based decoder, a moving picture experts group (MPEG)-4 based decoder, a HEVC based encoder and a MPEG-4 based encoder. Alternatively, in an embodiment, the system 200 may be communicatively associated or coupled with a video encoder/decoder such that video data may be received from the video encoder/decoder and predicted chroma residual data may be provided to the video encoder/decoder. In an embodiment, the video data may include, for example, frames, fields and/or pictures comprising moving content.

In an embodiment, the system 200 is configured to include a processing module 202 and a coding module 204. In an embodiment, the processing module 202 and the coding module 204 are configured to communicate with each other via or through a bus 206. Examples of the bus 206 may include, but are not limited to, a data bus, an address bus, a control bus, and the like. The bus 206 may be, for example, a serial bus, a bi-directional bus or a unidirectional bus.

As explained in FIGS. 1A and 1B, reconstructed residual data in form of reconstructed residual samples may be obtained on performing de-quantization and inverse transformation of residual samples. The generation of residual samples and reconstructed residual samples may be performed separately for luminance (hereinafter referred to as luma) components and chrominance (hereinafter referred to as chroma) components corresponding to a block of video data. The residual samples and reconstructed residual samples corresponding to luma are hereinafter referred to as luma residual samples and reconstructed luma residual samples, respectively. Similarly, the residual samples and reconstructed residual samples corresponding to chroma are hereinafter referred to as chroma residual samples and reconstructed chroma residual samples, respectively. In an embodiment, the term 'reconstructed residual samples' (for example, reconstructed luma residual samples and/or reconstructed chroma residual samples) refer to samples obtained after subjecting the residual samples through processes, such as transformation, quantization, de-quantization and inverse transformation and which correspond to the same original form of residual samples, approximately.

In an embodiment, the processing module 202 is configured to compute at least one coefficient correlating reconstructed luma residual samples and corresponding reconstructed chroma residual samples for one or more encoded blocks of video data. In an embodiment, the one or more encoded blocks correspond to encoded blocks neighboring a block of video data currently being encoded. As explained in FIG. 1A, for encoding purposes, a frame corresponding to video data may be considered to include a plurality of pixel blocks (for example, 4×4, 16×16, 32×32 block of pixels and the like). For encoding each block (for example, block of pixels) of video data, at least one coefficient correlating reconstructed luma residual samples and corresponding reconstructed chroma residual samples for one or more previously encoded neighboring blocks is computed. In an embodiment, the one or more encoded blocks correspond to at least one of a top neighboring block and a left neighboring block neighboring a block of video data currently being encoded in the frame associated with the block of the video data. In an embodiment, at least one coefficient signifying a correlation between reconstructed luma residual samples and reconstructed chroma residual samples for the one or more encoded blocks is computed based on a least mean square error approximation corresponding to a linear model. More specifically, the at least one coefficient corresponds to a linear model coefficient obtained based on least mean square error metric. In an embodiment, coefficients α and β corresponding to linear model based on least mean square error metric are computed based on the following equations (1) and (2):

$$\alpha = \cfrac{I \cdot \sum_{i=0}^{I-1} RecRes_c(i) \cdot RecRes'_L(i) - \sum_{i=0}^{I-1} RecRes_c(i) \cdot \sum_{i=0}^{I-1} RecRes'_L(i)}{I \cdot \sum_{i=0}^{I-1} RecRes'_L(i) \cdot RecRes'_L(i) - \left[\sum_{i=0}^{I-1} RecRes'_L(i)\right]^2} \quad (1)$$

$$\beta = \cfrac{\sum_{i=0}^{I-1} RecRes_c(i) \cdot - \alpha * \sum_{i=0}^{I-1} RecRes'_L(i)}{I} \quad (2)$$

wherein α, β are coefficients of linear model, $RecRes_c$ (i) corresponds to reconstructed chroma residual sample i, $RecRes_L'$(i) corresponds to subsampled reconstructed luma residual sample i and I is the total number of neighboring samples used.

In an embodiment, for a block of video data being encoded, reconstructed luma and chroma residual sample values corresponding to at least one of a left neighboring block and a top neighboring block to the block being encoded are provided as an input to least mean square formulation (for example, formulations as depicted in equations (1) and (2)) to compute coefficients, α and β signifying correlation between reconstructed luma residual samples and corresponding reconstructed chroma residual samples. In an embodiment, the at least one coefficient is computed for obtaining correlation between reconstructed luma residual samples and each of $C_b$ and $C_r$ components corresponding to the reconstructed chroma residual samples. In an embodiment, separate α and β are calculated for $C_b$ and $C_r$ components. These may be denoted as $\alpha_{cb}$ and $\beta_{cb}$ for $C_b$ samples and $\alpha_{cr}$ and $\beta_{cr}$ for $C_r$ samples. It is noted that the computation of the at least one coefficient may not be restricted to the least mean square approximation of the linear model and that the relationship between reconstructed luma residual samples and reconstructed chroma residual samples may be obtained using a variety of approximations for both linear and non-linear models.

In an embodiment, the at least one coefficient is computed on determining a presence of at least one block encoded based on an inter-prediction coding scheme neighboring the block of video data and comprising motion vectors in correlation with motion vectors corresponding to the block of video data. If motion vector of a neighboring block is not correlated with the motion vector of current block, then the linear model constructed using that neighboring block's residual samples may be less likely to be useful to predict chroma residual samples of current block. Hence, neighboring samples with uncorrelated motion vectors may be dropped from the linear model estimation. Similarly, if the neighboring block is encoded using intra-prediction coding scheme, then samples from the neighboring block may not be used for chroma residual prediction.

In an example embodiment, an encoding of video data may follow a raster scan order and accordingly blocks of video data may be encoded from left to right and from top to bottom for each frame corresponding to the video data. Accordingly, prior to computation of the at least one coefficient, such as α and β, the processing module 202 may be configured to check a presence of at least one encoded neighboring block (for example, a top neighboring block or a left neighboring block) for each block of video data being encoded. If the block of video data is at a frame boundary and has no previously encoded blocks neighboring the block, the computation of the at least one coefficient may be precluded. A prediction of chroma residual samples may be skipped and the block of video data may be encoded based on chroma residual samples.

In an embodiment, if a presence of at least one encoded neighboring block is ascertained then the processing module 202 is configured to check whether the coding scheme for encoding the at least one encoded block is an intra-prediction coding scheme or an inter-prediction coding scheme. In an embodiment, if it is determined that the at least one encoded neighboring block is encoded based on the intra-prediction coding scheme, then the computation of the at least one coefficient may be precluded and the block of video data may be encoded based on chroma residual samples. In an embodiment, if it is determined that the at least one encoded neighboring block is encoded based on the inter-prediction coding scheme, then the processing module 202 is configured to ascertain a presence of a correlation between motion vectors corresponding to the at least one encoded neighboring block and the block of video data being encoded. If a presence of correlation between motion vectors corresponding to the at least one encoded neighboring block and the block of video data being encoded is ascertained then the at least one coefficient, such as α and β, representing a correlation between reconstructed luma residual samples and reconstructed chroma residual samples is computed. In an embodiment, presence of correlation between motion vectors corresponding to the at least one encoded block and the block of video data being encoded is ascertained as follows:

If {(abs(mv_LN(x)−mv_CUR(x))>threshold)||(abs(mv_LN (y)−mv_CUR(y))>threshold)||(LN_mode==intra-prediction coding scheme)} then residual samples corresponding to left neighboring block are excluded from computation of the at least one coefficient, wherein LN is left neighboring block to the block of video data being encoded, mv_LN(x,y) corresponds to motion vector associated with the left neighboring block, CUR_LN (x,y) corresponds to motion vector associated with the current block of video data, threshold is a pre-defined value and LN_mode corresponds to a coding scheme corresponding to the left neighboring block.

Similarly, if {(abs(mv_TN(x)−mv_CUR(x))>threshold)|| (abs(mv_TN(y)−mv_CUR(y))>threshold)|| (TN_mode==intra-prediction coding scheme)} then residual samples corresponding to top neighboring block are excluded from computation of the at least one coefficient, wherein TN is top neighboring block to the block of video data being encoded, mv_TN(x,y) corresponds to motion vector associated with the top neighboring block, CUR_TN (x,y) corresponds to motion vector associated with the current block of video data, threshold is a pre-defined value and TN_mode corresponds to a coding scheme corresponding to the top neighboring block.

In an embodiment, if residual samples corresponding to both left and top neighboring blocks are excluded, then the computation of the at least one coefficient may be precluded and the block of video data may be encoded based on chroma residual samples. In an embodiment, if residual samples corresponding to at least one of left and top neighboring blocks are not excluded, then the at least one coefficient may be computed based on the included reconstructed luma and chroma residual samples corresponding to the non-excluded at least one neighboring block. The chroma residual samples for a block of video data being encoded may be predicted based on corresponding reconstructed luma residual samples and the computed at least one coefficient.

In an embodiment, the coding module 204 is configured to perform subsampling of the reconstructed luma residual samples corresponding to the one or more encoded blocks of video data prior to computing the at least one coefficient if a number of reconstructed luma residual samples is greater than a number of the reconstructed chroma residual samples. In an embodiment, a sampling rate for sampling luma and chroma components corresponding to blocks of video data may vary. For example, a sampling rate for chroma components may be configured to be half of a sampling rate for luma components. Accordingly, the reconstructed luma residual samples may be down sampled (or subsampled) in vertical direction and in horizontal direction to obtain luma block that matches size and phase of chroma block of video data. In an embodiment, the subsampling is performed based on a pre-defined chroma subsampling metric. In an example embodiment, the chroma subsampling metric may be a ratio corresponding to one of 4:2:2 and 4:2:0. A chroma subsampling metric of 4:2:2 may imply two reconstructed luma residual samples for one reconstructed chroma residual sample for $C_b$ and $C_r$ chroma components. Similarly, a chroma subsampling metric of 4:2:0 may imply two reconstructed luma residual samples for one reconstructed chroma residual sample for one of $C_b$ and $C_r$ chroma components. Accordingly, subsampling of reconstructed luma residual samples may be performed to configure an equal number of samples for reconstructed luma and chroma residual samples. In an example embodiment, the subsampling is performed based on following equation (3):

$$RecRes_L'[x,y]=(RecRes_L[2x,2y]+RecRes_L[2x,2y+1])>>1 \quad (3)$$

wherein x, y correspond to residual sample co-ordinates, $RecRes_L'[x,y]$ corresponds to subsampled reconstructed luma residual sample and $RecRes_L[x,y]$ corresponds to reconstructed luma residual sample.

It is noted that subsampling of the reconstructed luma residual samples may not be restricted to the example provided in equation (3) and that the subsampling may be performed in various manners to achieve the objective of configuring an equal number of reconstructed luma and chroma residual samples. Moreover, it is noted that in case of a chroma subsampling metric chosen to be 4:4:4, implying one reconstructed luma residual sample for each reconstructed chroma residual sample for $C_b$ and $C_r$ chroma components, then the subsampling of reconstructed luma residual samples may be precluded as a number of reconstructed luma and chroma residual samples are equal.

In an embodiment, the coding module 204 is configured to generate predicted chroma residual samples for encoding a block of video data based on corresponding reconstructed luma residual samples and the at least one coefficient. More specifically, for each block of video data being encoded, coefficients of linear model, such as α and β, are derived using least mean square error criterion applied to the reconstructed luma and chroma residual samples of previously encoded blocks, and, using the relationship represented by these coefficients to predict chroma residual samples based on reconstructed luma residual samples for the block being encoded. In an embodiment, the block of video data is configured to be encoded based on the inter-prediction coding scheme. In an embodiment, the predicted chroma residual samples are generated based on corresponding reconstructed luma residual samples and the at least one coefficient using the following equation (4):

$$PredRes_c[x,y]=\alpha.RecRes_L'[x,y]+\beta \quad (4)$$

wherein x, y correspond to residual sample co-ordinates, $PredRes_C[x,y]$ corresponds to predicted chroma (either $C_b$ or $C_r$) residual samples, $RecRes_L'[x,y]$ corresponds to sub-sampled reconstructed luma residual sample, and a and are coefficients of the linear model In an embodiment, the coding module 204 is configured to perform subsampling of reconstructed luma residual samples corresponding to the block of video data prior to generating the predicted chroma residual samples if a number of reconstructed luma residual samples is greater than a number of chroma residual samples. Since a sampling rate for sampling luma and chroma components corresponding to a block of video data may vary, reconstructed luma residual samples may be down sampled (or subsampled) in vertical direction and in horizontal direction to obtain luma block that matches size and phase of chroma block of video data. In an embodiment, the subsampling is performed based on a pre-defined chroma subsampling metric. In an example embodiment, the chroma subsampling metric may be a ratio corresponding to one of 4:2:2 and 4:2:0. If the chroma subsampling metric is one of 4:2:2 and 4:2:0 then the subsampling may be performed as explained in equation (3). However, if the chroma subsampling metric is 4:4:4, then subsampling of reconstructed luma residual samples is precluded.

In an embodiment, the coding module 204 is configured to generate chroma residual error samples by subtracting the predicted chroma residual samples from chroma residual samples corresponding to the block of video data. In an embodiment, the processing module 202 is configured to compute a cost associated with the chroma residual error samples and a cost associated with the chroma residual samples for the block of video data. In an embodiment, the processing module 202 is further configured to compare the cost associated with the chroma residual error samples with the cost associated with the chroma residual samples. In an embodiment, a metric for computing the cost associated with the chroma residual error samples and the cost associated with the chroma residual samples may be, but is not limited to, one of sum of absolute differences, sum of squared differences, rate distortion optimization (RDO) and approximate RDO.

In an embodiment, the processing module 202 is configured to perform selection of one of a chroma residual prediction mode and a chroma prediction mode. In an embodiment, the chroma residual prediction mode may be selected if the cost associated with the chroma residual error samples is less than the cost associated with the chroma residual samples. In an embodiment, the encoding of the block of video data is performed based on the chroma residual error samples on selection of the chroma residual prediction mode. In an embodiment, the chroma prediction mode may be selected if the cost associated with the chroma residual samples is less than or equal to the cost associated with the chroma residual error samples. In an embodiment, the encoding of the block of video data is performed based on the chroma residual samples on selection of the chroma prediction mode.

In an embodiment, the processing module 202 is configured to compute a cost of chroma residual prediction mode based on following equation (5):

$$\cos t=\Sigma abs(Current_C[x,y]-Pred_C[x,y]-PredRes_C[x,y]) \quad (5)$$

wherein summation is done over $C_b$ as well as $C_r$ samples and wherein [x,y] corresponds to sample co-ordinates, $\text{Current}_C[x,y]$ corresponds to current chroma (either $C_b$ or $C_r$) sample, $\text{Pred}_C[x,y]$ corresponds to predicted chroma (either $C_b$ or $C_r$) sample, and $\text{PredRes}_C[x,y]$ corresponds to predicted chroma (either $C_b$ or $C_r$) residual sample. In an embodiment, if the cost as computed in equation (5) is smaller than cost of prediction based on chroma residual samples computed based on similar formulation, then chroma residual prediction mode may be selected.

In an embodiment, the predicted chroma residual samples are generated for one of $C_b$ and $C_r$ chroma components corresponding to the block of video data. In an embodiment, predicted chroma residual samples are generated for remaining of the $C_b$ and $C_r$ chroma components based on the reconstructed luma residual samples and the predicted chroma residual samples generated for one of the $C_b$ and $C_r$ chroma components. For example, $C_b$ residual samples may be predicted from reconstructed luma residual samples as explained in equation (4) and subsequently, residual samples corresponding to $C_r$ (for example, remaining of the $C_b$ and $C_r$ chroma component), may be predicted using a linear model computed based on both luma and $C_b$ reconstructed residual samples. In an embodiment, a weighted sum of luma and $C_b$ reconstructed residuals are calculated, for example, using either one of following equations (6) and (7):

$$\text{RecRes}_{LCb} = \text{RecRes}_L + \text{RecRes}_{Cb} \quad (6)$$

$$\text{RecRes}_{LCb} = \alpha_{cb} * \text{RecRes}_L + \beta_{cb} + \text{RecRes}_{Cb} \quad (7)$$

Wherein $\text{RecRes}_{LCb}$ corresponds to weighted sum of reconstructed luma and $C_b$ residual samples, $\text{RecRes}_{L'}$ corresponds to subsampled reconstructed luma residual samples, $\text{RecRes}_{Cb}$ corresponds to reconstructed $C_b$ residual samples, and $\alpha_{cb}$ and $\beta_{cb}$ are obtained as explained in equations (1) and (2).

In an embodiment, the $\text{RecRes}_{LCb}$ samples are used to replace $\text{RecRes}_L[x,y]$ samples to calculate $\alpha_{cr}$ and $\beta_{cr}$ for example based on equations (1) and (2) and $C_r$ residual samples may then be predicted using these computed coefficients of the linear model. In an embodiment, $C_r$ residual samples may be predicted from reconstructed luma residual samples as explained in equation (4) and subsequently, residual samples corresponding to $C_b$, may be predicted using a linear model computed based on both luma and $C_r$ reconstructed residual samples. In an embodiment, an original left neighboring block's residual samples and reconstructed top neighboring block's residual samples may be used for linear model estimation. More specifically, in a pipelined hardware implementation, left neighboring block's reconstructed residual samples may not be available for linear model estimation. Accordingly, in such cases, original luma and chroma residual samples from left neighboring block may be used for prediction purposes.

As explained, the prediction of chroma residual samples may especially be applicable for blocks of video data configured to be encoded using the inter-prediction coding scheme. Such applicability of chroma residual data prediction increases an overall effectiveness of prediction of residual data, since a higher proportion of blocks are encoded based on the inter-prediction coding scheme. Increasing an effectiveness of prediction decreases an energy associated with residual samples thereby adversely improving compression efficiency and peak signal to noise ratio (PSNR) associated with the video data. The encoding of blocks corresponding to video data based on generated chroma residual data prediction is explained further in FIG. 3.

Figure 3:
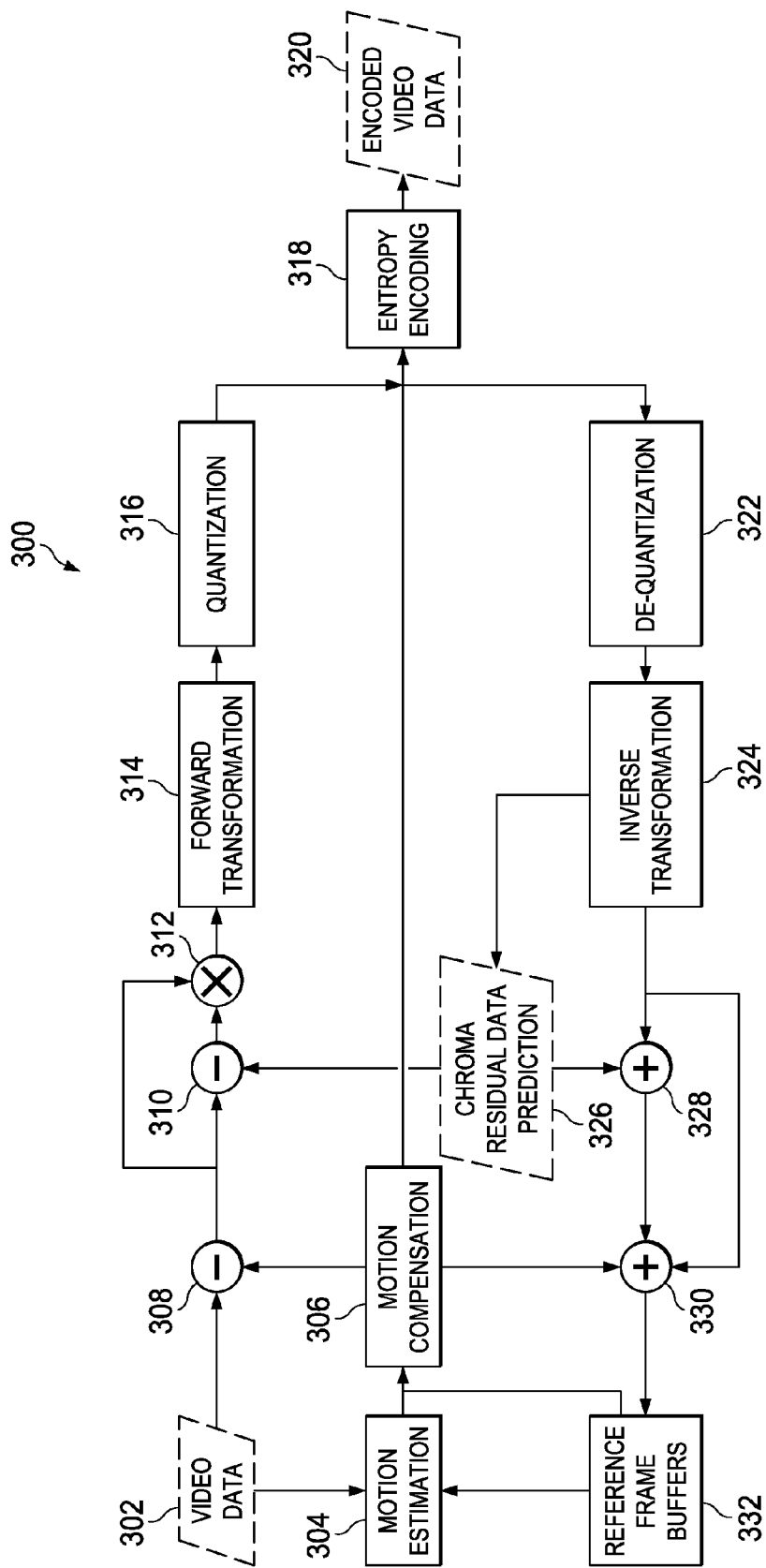
FIG. 3 illustrates a simplified overview of a process of encoding blocks corresponding to video data based on generated chroma residual data prediction in accordance with an embodiment.

FIG. 3 illustrates a simplified overview of a process 300 for encoding blocks corresponding to video data 302 (such as video data 102 explained in FIG. 1A) based on generated chroma residual data prediction in accordance with an embodiment. In an example embodiment, the process 300 may be implemented by system 200 explained in FIG. 2. In an example embodiment, a video encoder configured to comply with at least one of H.264 coding paradigm, MPEG-4 AVC paradigm, and HEVC paradigm may implement the process 300. In an embodiment, the video encoder may be configured to be a part of multimedia system, such as the multimedia system explained in FIG. 2. In an embodiment, the video encoder may be configured to be external to the multimedia system and may be capable of communicatively associated with the multimedia system.

In an example embodiment, the video data 302 may include a sequence of video frames, and each frame from among the sequence of frames may include a plurality of blocks (for example, 4×4 block of pixels, 16×16 block of pixels and the like) of video data 302. At 304 of the process 300, motion estimation may be performed for a block of video data 302 currently being encoded (hereinafter referred to as "current block") based on previously encoded blocks of video data 302. The motion estimation may be performed to identify motion vectors corresponding to the previously encoded blocks of video data 302. At 306, for motion compensation, motion vector information most likely to match motion vectors corresponding to the current block is determined from among the identified motion vectors during motion estimation. The determined motion vector information may configure the prediction for the current block. In an example embodiment, the prediction may be individually performed for luma and chroma components corresponding to the current block.

In an example embodiment, the prediction corresponding to luma component (hereinafter referred to as luma prediction) may be subtracted from the luma component corresponding to the current block at 308 to generate luma residual samples. In an example embodiment, for luma residual samples, process stages of subtraction and mode selection at 310 and 312, respectively, may be skipped and the luma residual samples may be provided for forward transformation at 314 to output a set of transform coefficients, each of which is a weighting value for a preselected basis pattern. The weighted basis pattern, when combined, is capable of recreating the luma residual samples.

In an embodiment, the prediction at 306 may be generated in form of blocks, such as a 16×16 prediction block. Similarly the transformation process stage may yield output in form of blocks, such as 32×32 transform block. It is noted that the prediction block and the transform block may be basic units of prediction and transformation, respectively, as per one or more video coding paradigms including, for example, H.264 coding paradigm, HEVC paradigm, and the like. For example, the prediction blocks may include prediction units and the transform blocks may include transform units, where the prediction units and the transform units are defined as per the HEVC paradigm. In an embodiment, the prediction units and the transform units may be a part of a coding unit of the HEVC paradigm. It is noted that the term 'coding unit' may be construed as referring to a basic unit of compression in the HEVC paradigm and is broadly analogous to the concept of macro block in the H.264 coding paradigm but is comparatively more flexible in terms of variable size. In the HEVC paradigm, the size of the coding units may be of the order of, for example, 32×32, or 64×64. Each coding unit may include multiple prediction units and/or transform units. A transform unit may include one or more prediction units. Alternatively, a prediction unit may include one or more transform units. In addition to 4×4 and 8×8 transforms, 16×16, 32×32, 32×16, 16×32, 16×8 and 8×16 transforms may be supported by transform units of the HEVC paradigm.

At 316, a quantization of the set of transform coefficients (such as where each coefficient is scaled according to a scale-down factor, which may be a mathematical reciprocal of the scale-up factor specified by a video coding paradigm, effectively setting a number of transform coefficients to a small value (including zero value)) may be performed. The quantized transform coefficients may be entropy encoded (for example, converted into binary codes using variable length coding and/or arithmetic coding) at 318 to configure encoded information corresponding to the luma residual samples. At 322 of the process 300, the quantized transform coefficients may be provided for de-quantization (such as where each coefficient is scaled according to a scale-up factor specified by a video coding paradigm). At 324, the de-quantized transform coefficients may be provided for inverse transformation to generate reconstructed luma residual samples corresponding to the current block. In an example embodiment, for reconstructed luma residual samples, process stage of addition at 328 may be skipped and the reconstructed luma residual samples may be added with the luma prediction to configure reconstructed luma samples which in conjunction with reconstructed chroma samples may configure the reference frames for storage in reference frame buffers at 332. The reference frames from the reference frame buffers 332 may be utilized for motion estimation and motion compensation at 304 and 306, respectively, for subsequent blocks of video data 302.

In an example embodiment, at least one coefficient, such as α and β, correlating reconstructed luma residual samples and reconstructed chroma residual samples for previously encoded blocks of video data may be computed as explained in FIG. 2. At 326, the at least one coefficient computed from previously encoded blocks and the reconstructed luma residual samples for the current block may be utilized for generating chroma residual data prediction, for example in form of predicted chroma residual samples, for the current block at 326. The generation of the predicted chroma residual data may be performed as explained in FIG. 2.

As explained above, the process stages of 304 and 306 may generate a prediction corresponding to the chroma component (hereinafter referred to as the chroma prediction) for the current block of video data 302. The chroma prediction for the current block may be subtracted from the chroma component corresponding to the current block at 308 to generate chroma residual samples. The predicted chroma residual samples generated at 326 may be subtracted from the chroma residual samples obtained at 308 to generate chroma residual error samples at 310. At 312, a cost associated with chroma residual error samples may be compared with a cost associated with chroma residual samples. A metric for computing cost may include, but is not limited to one of sum of absolute differences, sum of squared differences, rate distortion optimization (RDO) and approximate RDO. Based on the comparison, one of a chroma prediction mode and a chroma residual prediction mode may be selected. In an embodiment, the chroma residual prediction mode is selected on determining the cost associated with the chroma residual error samples to be less than the cost associated with the chroma residual samples. In an embodiment, upon selection of the chroma residual prediction mode, the chroma residual error samples are provided for forward transformation at 314 and quantization at 316. The quantized transform coefficients corresponding to the chroma residual error samples may be subjected to entropy encoding at 318 to generate encoded information corresponding to the chroma component for the current block. The encoding of the block of video data 302 may thereby be achieved in form of encoded video data 320 including encoded information corresponding to the luma and chroma components corresponding to the current block.

In an embodiment, the quantized transform coefficients corresponding to the chroma residual error samples may also be provided at 322 for dequantization and inverse transformation at 324 to obtain the chroma residual error samples. The predicted chroma residual samples may be added to the chroma residual error samples at 328 to obtain reconstructed chroma residual samples. The reconstructed chroma residual samples may be added to chroma prediction at 330 to generate reconstructed chroma samples, which in conjunction with reconstructed luma samples, may configure the reference frames as explained above.

In an embodiment, the chroma prediction may include predictions for $C_b$ and $C_r$ components. In an embodiment, $C_b$ residual samples may be predicted from reconstructed luma residual samples as explained in equation (4) and subsequently, residual samples corresponding to $C_r$, may be predicted using a linear model computed using both luma and $C_b$ reconstructed residual samples. In an embodiment, a weighted sum of luma and $C_b$ reconstructed residuals may be calculated for example using either one of equations (6) and (7). In an embodiment, $C_r$ residual samples may be predicted from reconstructed luma residual samples as explained in equation (4) and subsequently, residual samples corresponding to $C_b$, may be predicted using a linear model computed using both luma and $C_r$ reconstructed residual samples. In an embodiment, a weighted sum of luma and $C_r$ reconstructed residuals may be calculated for example using either one of equations (6) and (7).

In an embodiment, the chroma prediction mode may be selected if the cost associated with the chroma residual samples is less than or equal to the cost associated with the chroma residual error samples. In an embodiment, the encoding of the block of video data is performed based on the chroma residual samples on selection of the chroma prediction mode. More specifically, on selection of the chroma prediction mode at 312, the chroma residual samples are provided to forward transformation at 314, quantization at 316 and entropy encoding at 318 to generate encoded video data corresponding to the chroma component.

In an embodiment, the quantized transform coefficients corresponding to the chroma residual samples may also be provided at 322 for de-quantization and inverse transformation at 324 to obtain the reconstructed chroma residual samples. For chroma prediction mode, the process stage of 328 may be skipped and the reconstructed chroma residual samples may be added to chroma prediction at 330 to generate reconstructed chroma samples, which in conjunction with reconstructed luma samples, may configure the reference frames as explained above. In an embodiment, a cost of selecting the chroma residual prediction mode is determined by using equation (5) as explained in FIG. 2. If the cost of using chroma residual prediction mode is less than that of using chroma prediction mode, then chroma residual prediction mode is selected; else chroma prediction mode is selected. In an embodiment, the chroma prediction mode is selected if no neighboring block encoded based on the inter-prediction coding scheme is determined to be present for the current block. In an embodiment, if a presence of at least one encoded neighboring block is ascertained, then it is checked if the at least one encoded neighboring block comprises motion vectors correlated with motion vectors corresponding to the current block. If the motion vectors are ascertained to be correlated then chroma residual prediction mode is selected; else chroma prediction mode is selected.

In an embodiment, the selection of either of the chroma residual prediction mode or the chroma prediction mode is conveyed to a video decoder. In an embodiment, a one-bit flag may be included in the transmitted encoded video data 320 to indicate the selection of mode. It is noted that though FIG. 3 depicts an encoder perspective of utilization of chroma residual data prediction for encoding of blocks corresponding to video data 302, the decoder may utilize similar mechanism for chroma residual data prediction at its end for reconstruction of video data 302. More specifically, the encoded video data 320 subsequent to entropy decoding, de-quantization and inverse transformation may provide chroma residual error samples, which may be added to predicted chroma residual samples to generate reconstructed chroma residual samples. The chroma prediction may be subsequently added to the reconstructed chroma residual samples to generate reconstructed chroma samples corresponding to decoded video data 302. A method for chroma residual data prediction is explained in FIG. 4.

Figure 4:
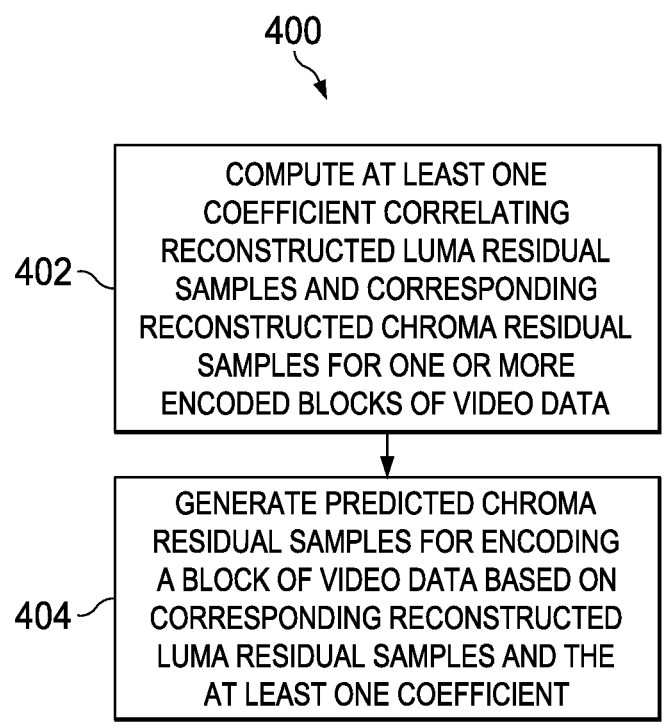
FIG. 4 is a flow diagram of an exemplary method for chroma residual data prediction in accordance with an embodiment.

FIG. 4 is a flow diagram of a method 400 for chroma residual data prediction in accordance with an embodiment. In an embodiment, a data processing device, for example, a computer, may implement the method 400. In an embodiment, the system 200 of FIG. 2 may employ the method 400 for chroma residual data prediction. Operations of the flowchart, and combinations of operation in the flowchart, may be implemented by various means, such as hardware, firmware, processor, circuitry and/or other device associated with execution of software including one or more computer program instructions. The operations of the method 400 are described with help of the system 200. However, the operations of the method can be described and/or practiced by using any other system. The method 400 starts at operation 402. At operation 402, at least one coefficient correlating reconstructed luma residual samples and corresponding reconstructed chroma residual samples is computed (for example, using processing module 202 of FIG. 2) for one or more encoded blocks of video data. In an embodiment, the one or more encoded blocks correspond to encoded blocks neighboring a block of video data currently being encoded. In an embodiment, the one or more encoded blocks correspond to at least one of a top neighboring block and a left neighboring block neighboring a block of video data currently being encoded in the frame associated with the block of the video data. In an embodiment, at least one coefficient signifying a correlation between reconstructed luma residual samples and reconstructed chroma residual samples for the one or more encoded blocks is computed based on a least mean square error approximation corresponding to a linear model. More specifically, the at least one coefficient corresponds to a linear model coefficient obtained based on least mean square error metric. In an embodiment, coefficients α and β corresponding to linear model based on least mean square error metric are computed based on equations (1) and (2) as explained in FIG. 2.

In an embodiment, for a block of video data being encoded, reconstructed luma and chroma residual sample values corresponding to at least one of a left neighboring block and a top neighboring block to the block being encoded are provided as an input to least mean square formulation (for example, formulations as depicted in equations (1) and (2)) to compute coefficients, α and β signifying correlation between reconstructed luma residual samples and corresponding reconstructed chroma residual samples. In an embodiment, the at least one coefficient is computed for obtaining correlation between reconstructed luma residual samples and each of $C_b$ and $C_r$ components corresponding to the reconstructed chroma residual samples. In an embodiment, separate α and β are calculated for $C_b$ and $C_r$ components. These may be denoted as $α_{cb}$ and $β_{cb}$ for $C_b$ samples and $α_{cr}$ and $β_{cr}$ for $C_r$ samples. It is noted that the computation of the at least one coefficient may not be restricted to the least mean square approximation of the linear model and that the relationship between reconstructed luma residual samples and reconstructed chroma residual samples may be obtained using a variety of approximations for both linear and non-linear models.

In an embodiment, the at least one coefficient is computed on determining presence of at least one block encoded based on an inter-prediction coding scheme neighboring the block of video data and comprising motion vectors in correlation with motion vectors corresponding to the block of video data. In an example embodiment, an encoding of video data may follow a raster scan order and accordingly blocks of video data may be encoded from left to right and from top to bottom for each frame corresponding to the video data. Accordingly, prior to computation of the at least one coefficient, such as α and β, a presence of at least one encoded neighboring block (for example, a top neighboring block or a left neighboring block) is checked for each block of video data being encoded. If the block of video data is at a frame boundary and has no previously encoded blocks neighboring the block, the computation of the at least one coefficient may be precluded. A prediction of chroma residual samples may be skipped and the block of video data may be encoded based on chroma residual samples.

In an embodiment, if a presence of at least one encoded neighboring block is ascertained then it is checked (for example, using the processing module 202 of FIG. 2) whether the coding scheme for encoding the at least one encoded block is an intra-prediction coding scheme or an inter-prediction coding scheme. In an embodiment, if it is determined that the at least one encoded neighboring block is encoded based on the intra-prediction coding scheme, then the computation of the at least one coefficient may be precluded and the block of video data may be encoded based on chroma residual samples. In an embodiment, if it is determined that the at least one encoded neighboring block is encoded based on the inter-prediction coding scheme, then a presence of a correlation between motion vectors corresponding to the at least one encoded neighboring block and the block of video data being encoded is checked (for example, using the processing module 202 of FIG. 2). If a presence of correlation between motion vectors corresponding to the at least one encoded neighboring block and the block of video data being encoded is ascertained then the at least one coefficient, such as β and β, representing a correlation between reconstructed luma residual samples and reconstructed chroma residual samples is computed. In an embodiment, presence of correlation between motion vectors corresponding to the at least one encoded block and the block of video data being encoded is ascertained as follows:
If {(abs(mv_LN(x)−mv_CUR(x))>threshold)||(abs(mv_LN (y)−mv_CUR(y))>threshold)||(LN_mode==intra-prediction coding scheme)} then residual samples corresponding to left neighboring block are excluded from computation of the at least one coefficient,
wherein LN is left neighboring block to the block of video data being encoded, mv_LN(x,y) corresponds to motion vector associated with the left neighboring block, CUR_LN (x,y) corresponds to motion vector associated with the current block of video data, threshold is a pre-defined value and LN_mode corresponds to a coding scheme corresponding to the left neighboring block.

Similarly, if {(abs(mv_TN(x)−$mv$_CUR(x))>threshold)∥ (abs(mv_TN(y)−mv_CUR(y))>threshold)∥ (TN_mode==intra-prediction coding scheme)} then residual samples corresponding to top neighboring block are excluded from computation of the at least one coefficient, wherein TN is top neighboring block to the block of video data being encoded, mv_TN(x,y) corresponds to motion vector associated with the top neighboring block, CUR_TN (x,y) corresponds to motion vector associated with the current block of video data, threshold is a pre-defined value and TN_mode corresponds to a coding scheme corresponding to the top neighboring block.

In an embodiment, if residual samples corresponding to both left and top neighboring blocks are excluded, then the computation of the at least one coefficient may be precluded and the block of video data may be encoded based on chroma residual samples. In an embodiment, if residual samples corresponding to at least one of left and top neighboring blocks are not excluded, then the at least one coefficient may be computed based on the included reconstructed luma and chroma residual samples corresponding to the non-excluded at least one neighboring block. The chroma residual samples for a block of video data being encoded may be predicted based on corresponding reconstructed luma residual samples and the computed at least one coefficient.

In an embodiment, a subsampling of the reconstructed luma residual samples corresponding to the one or more encoded blocks of video data is performed (for example, using the coding module 204 of FIG. 2) prior to computing the at least one coefficient if a number of reconstructed luma residual samples is greater than a number of the reconstructed chroma residual samples. In an embodiment, the subsampling is performed based on a pre-defined chroma subsampling metric based on equation (3) as explained in FIG. 2.

At 404, predicted chroma residual samples are generated (for example, using coding module 204 of FIG. 2) for encoding a block of video data based on corresponding reconstructed luma residual samples and the at least one coefficient. More specifically, for each block of video data being encoded, coefficients of linear model, such as α and β, are derived using least mean square error criterion applied to the reconstructed luma and chroma residual samples of previously encoded blocks, and, using the relationship represented by these coefficients to predict chroma residual samples based on reconstructed luma residual samples for the block being encoded. In an embodiment, the block of video data is configured to be encoded based on the inter-prediction coding scheme. In an embodiment, the predicted chroma residual samples are generated based on corresponding reconstructed luma residual samples and at least one coefficient using the equation (4) as explained in FIG. 2.

In an embodiment, a subsampling of the reconstructed luma residual samples corresponding to the block of video data is performed (for example, by using the coding module 204 of FIG. 2) prior to generating the predicted chroma residual samples if a number of reconstructed luma residual samples is greater than a number of chroma residual samples. In an embodiment, the subsampling is performed based on a pre-defined chroma subsampling metric. In an example embodiment, the chroma subsampling metric may be a ratio corresponding to one of 4:2:2 and 4:2:0. If the chroma subsampling metric is one of 4:2:2 and 4:2:0 then the subsampling may be performed as explained in equation (3). However, if the chroma subsampling metric is 4:4:4, then subsampling of the reconstructed luma residual samples is precluded.

In an embodiment, chroma residual error samples are generated (for example, using the coding module 204 of FIG. 2) by subtracting the predicted chroma residual samples from chroma residual samples corresponding to the block of video data. In an embodiment, a cost associated with chroma residual error samples and a cost associated with the chroma residual samples for the block of video data is computed (for example, using the processing module 202 of FIG. 2). In an embodiment, the cost associated with the chroma residual error samples is compared (for example, using the processing module 202 of FIG. 2) with the cost associated with the chroma residual samples. In an embodiment, a metric for computing the cost associated with chroma residual error samples and the cost associated with chroma residual samples may be, but is not limited to, one of sum of absolute differences, sum of squared differences, rate distortion optimization (RDO) and approximate RDO.

In an embodiment, a selection of one of a chroma residual prediction mode and a chroma prediction mode is performed (for example, using the processing module 202 of FIG. 2). In an embodiment, the chroma residual prediction mode may be selected if the cost associated with the chroma residual error samples is less than the cost associated with the chroma residual samples. In an embodiment, the encoding of the block of video data is performed based on the chroma residual error samples on selection of the chroma residual prediction mode. In an embodiment, the chroma prediction mode may be selected if the cost associated with the chroma residual samples is less than or equal to the cost associated with the chroma residual error samples. In an embodiment, the encoding of the block of video data is performed based on the chroma residual samples on selection of the chroma prediction mode.

In an embodiment, a cost of chroma residual prediction mode is calculated (for example, using the processing module 202 of FIG. 2) using equation (5) as explained in FIG. 2. In an embodiment, if the cost as computed in equation (5) is smaller than the cost of prediction based on chroma residual samples computed based on similar formulation, then chroma residual prediction mode may be selected.

In an embodiment, the predicted chroma residual samples are generated for one of $C_b$ and $C_r$ chroma components corresponding to the block of video data. In an embodiment, predicted chroma residual samples are generated for remaining of the $C_b$ and $C_r$ chroma components based on the reconstructed luma residual samples and the predicted chroma residual samples generated for one of the $C_b$ and $C_r$ chroma components. For example, $C_b$ residual samples may be predicted from reconstructed luma residual samples as explained in equation (4) and subsequently, residual samples corresponding to $C_r$, may be predicted using a linear model computed based on both luma and $C_b$ reconstructed residual samples. In an embodiment, a weighted sum of luma and $C_b$ reconstructed residuals is calculated, for example, using either one of following equations (6) and (7) as explained in FIG. 2.

In an embodiment, the samples corresponding to the weighted sum of reconstructed luma and $C_b$ residual samples is used to replace the subsampled reconstructed luma residual samples to calculate $α_{cr}$ and $β_{cr}$ for example based on equations (1) and (2) and $C_r$ residual samples may then be predicted using these computed coefficients of the linear model. In an embodiment, $C_r$ residual samples may be predicted from reconstructed luma residual samples as explained in equation (4) and subsequently, residual samples corresponding to $C_b$, may be predicted using a linear model computed based on both luma and $C_r$ reconstructed residual samples.

As explained, the prediction of chroma residual samples may especially be applicable for blocks of video data configured to be encoded using the inter-prediction coding scheme. Such applicability of chroma residual data prediction increases an overall effectiveness of prediction of residual data, since a higher proportion of blocks is encoded based on the inter-prediction coding scheme. Increasing an effectiveness of prediction decreases an energy associated with residual samples thereby adversely improving compression efficiency and peak signal to noise ratio (PSNR) associated with the video data. A method for encoding blocks corresponding to video data based on chroma residual data prediction is explained further herein with reference to FIG. 5.

Figure 5:
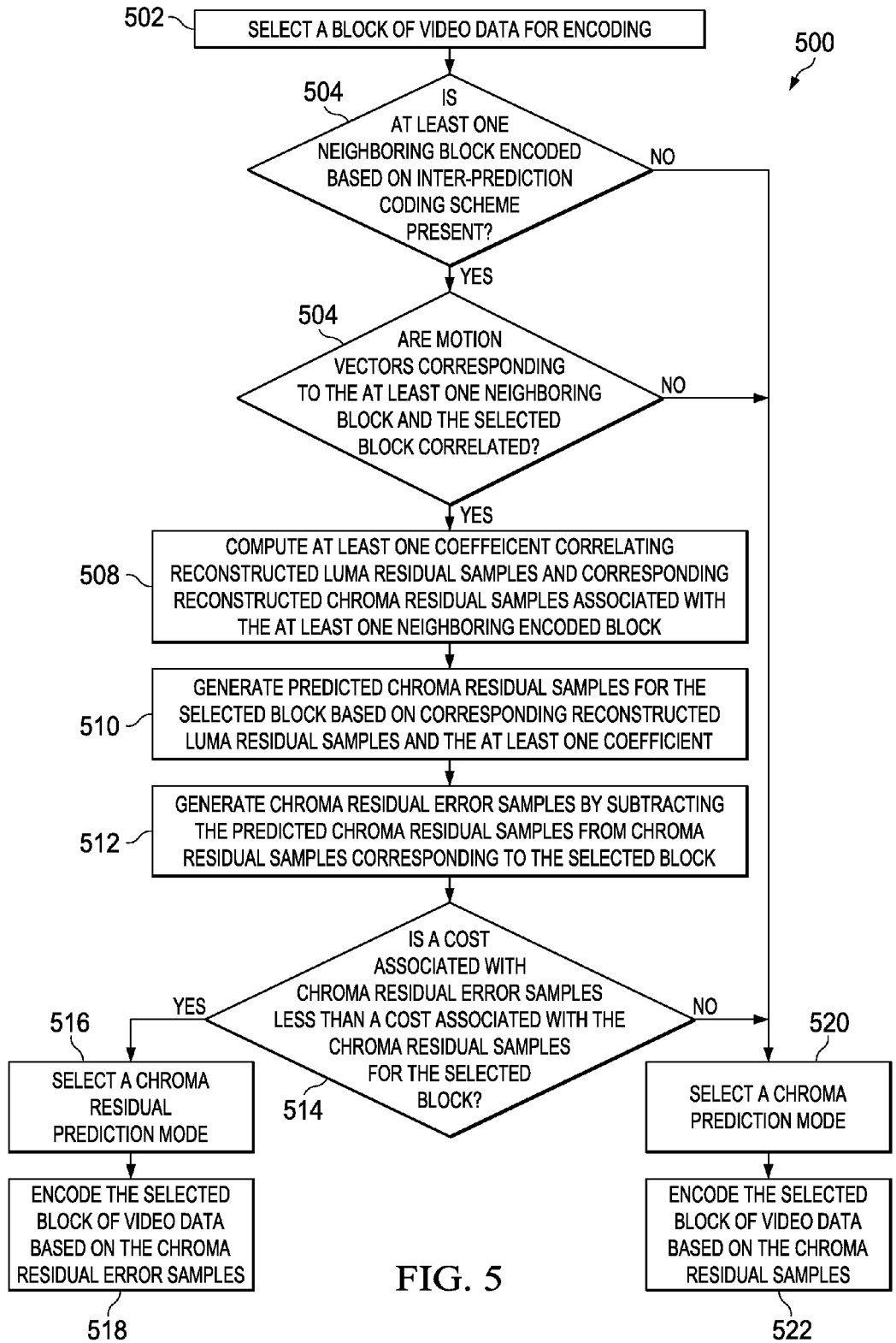
FIG. 5 is a flow diagram of an exemplary method for encoding a block corresponding to video data based on generated chroma residual data prediction in accordance with another embodiment.

FIG. 5 is a flow diagram of an exemplary method 500 for encoding a block corresponding to video data based on generated chroma residual data prediction in accordance with another embodiment. In an embodiment, the system 200 of FIG. 2 may employ the method 500 for chroma residual data prediction. The method 500 starts at operation 502. At operation 502, a block of video data is selected for encoding purposes. At operation 504, a presence of at least one neighboring block encoded based on an inter-prediction coding scheme is checked (for example, using the processing module 202 of FIG. 2). If it determined that at least one neighboring block encoded based on the inter-prediction coding scheme is present, then operation 506 is performed. At operation 506, it is checked (for example, using the processing module 202 of FIG. 2) if motion vectors corresponding to the at least one neighboring block and the selected block are correlated. The determination of the at least one neighboring block encoded based on the inter-prediction coding scheme and a checking of correlation of motion vectors may be performed as explained in FIG. 2.

If the motion vectors between the at least one neighboring block and the selected block are correlated then at operation 508, at least one coefficient correlating reconstructed luma residual samples and corresponding reconstructed chroma residual samples associated with the at least one neighboring encoded block is computed (for example, using the processing module 202 of FIG. 2). At operation 510, predicted chroma residual samples are generated (for example, using the coding module 204 of FIG. 2) for encoding a block of video data based on corresponding reconstructed luma residual samples and the at least one coefficient. The computation of the at least one coefficient and generation of predicted chroma residual samples may be performed based on equations (1), (2) and (4) as explained in FIG. 2.

At operation 512, chroma residual error samples are generated (for example, using the processing module 202 of FIG. 2) by subtracting predicted chroma residual samples from chroma residual samples corresponding to the selected block. At operation 514, it is checked (for example, using the processing module 202 of FIG. 2) if a cost associated with chroma residual error samples is less than a cost associated with the chroma residual samples for the selected block. If it is determined that the cost associated with the chroma residual error samples is less than the cost associated with the chroma residual samples, then operation 516 is performed. At operation 516, a chroma residual prediction mode is selected. If it is determined that the cost associated with the chroma residual error samples is not less than the cost associated with the chroma residual samples then operation 520 is performed. At operation 520, a chroma prediction mode is selected. In an embodiment, a cost of utilizing predicted chroma residual samples is determined based on equation (5) as explained in FIG. 2 and based on the determined cost, one of a chroma prediction mode and chroma residual prediction mode is selected. Further, on determining an absence of the at least one neighboring block encoded based on the inter-prediction coding scheme at 504, the chroma prediction mode is selected at 520. Furthermore, on determining an absence of a correlation between motion vectors corresponding to the at least one neighboring block and the selected block at 506, the chroma prediction mode is selected at 520. On selection of the chroma residual prediction mode at 516, the selected block is encoded based on the chroma residual error samples. On selection of the chroma prediction mode at 520, the selected block of video data is encoded based on chroma residual samples at 522. An integrated circuit for chroma residual data prediction is explained in FIG. 6.

Figure 6:
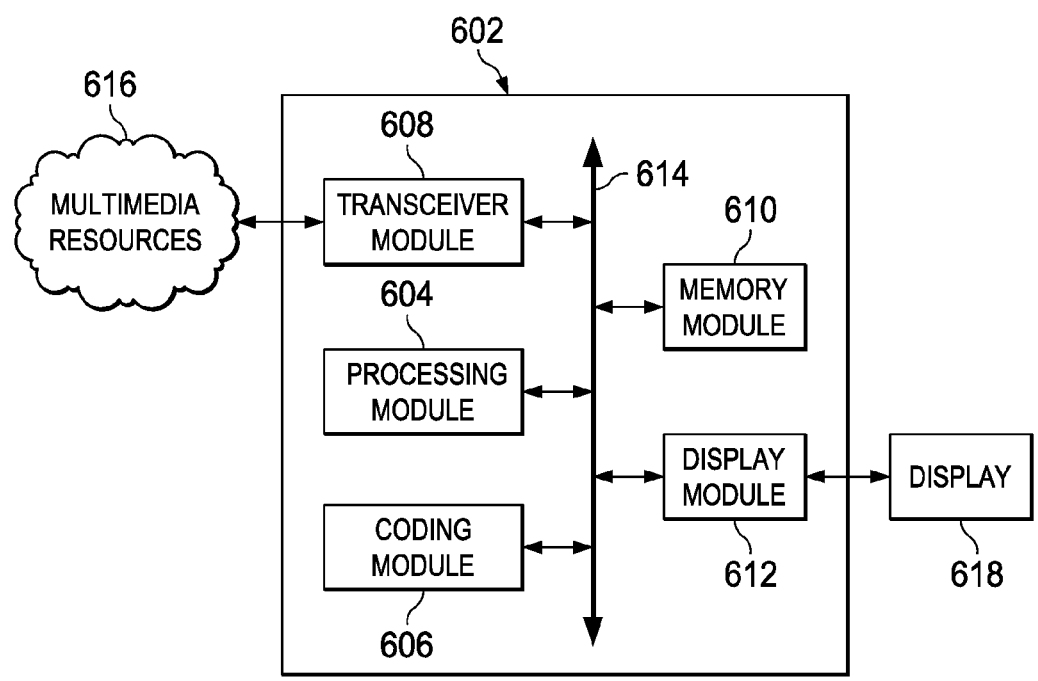
FIG. 6 is a block diagram of an exemplary integrated circuit configured to perform chroma residual data prediction in accordance with an embodiment.

FIG. 6 is a block diagram of an exemplary integrated circuit 602 configured to perform chroma residual data prediction in accordance with an embodiment. The integrated circuit 602 comprises a processing module 604, a coding module 606, a transceiver module 608, a memory module 610 and a display module 612. The processing module 604, the coding module 606, the transceiver module 608, the memory module 610 and the display module 612 are communicatively associated or coupled with each other using data path 614. As such, it should be appreciated that at least some of the components described below in connection with the integrated circuit 602 may be optional and thus in an example embodiment the integrated circuit 602 may include more, less or different components than those described in connection with the example embodiment of FIG. 6. In an embodiment, the integrated circuit 602 may include the processing module 604, the coding module 606 and the memory module 610 only.

The transceiver module 608 is communicatively associated or coupled with a plurality of multimedia resources 616 and is configured to receive video data from one or more multimedia resources from among the plurality of multimedia resources 616. Examples of the multimedia resources may include, but are not limited to (1) remote multimedia systems (2) media capture devices, such as, for example, a camera, camcorders and the like, and (3) multimedia storage devices, such as, for example, magnetic tapes, disks, computer-readable media and the like. In an embodiment, the transceiver module 608 may include an antenna and/or network connectors configured to coupled with or connect to wired networks (for example, local area networks (LANs)) and wireless networks (for example, cellular networks), or a combination thereof (for example, the Internet). Examples of network connectors may include a universal serial bus (USB) interface, a wireless LAN interface, an infrared interface, an Ethernet port and the like.

In an embodiment, the transceiver module 608 may be configured to receive the video data in encoded form and provide the encoded video data to the processing module 604, which in conjunction with the coding module 606 may be configured to decode the encoded video data and provide the decoded video data to the memory module 610 for storage or to the display module 612 for displaying the video data on a display 618. In an embodiment, the coding module 606 may be configured to encode the video data and provide the video data to transceiver module 608 for transmission purposes or to memory module 610 for storage purposes. In an embodiment, the processing module 604 and the coding module 606, may correspond to or are substantially similar to the processing module 202 and the coding module 204, respectively, of system 200 of FIG. 2. The processing module 604 and the coding module 606 are configured to perform functions as discussed in FIG. 2, which are not repeated herein for the sake of brevity.

The memory module 610 is configured to store the video data subsequent to one of encoding of video data and decoding of video data. Examples of memory module 610 may include, but are not limited to, random access memory (RAM), dual port RAM, synchronous dynamic RAM (SDRAM), double data rate SDRAM (DDR SDRAM), and the like. The display module 612 is configured to facilitate a display of the video data on display 618. The display 618 may be facilitated, for example, in response to a user input received using a user interface (not shown in FIG. 6). Examples of display 618 may include a light crystal display (LCD) panel, a plasma display panel, a field emission display and the like.

In an embodiment the integrated circuit 602 may be an application processor chip. In an embodiment, the integrated circuit 602 may be a part of a particular or shared processor chip that is embedded within a multimedia system. Examples of the multimedia systems may include, but are not limited to, (1) multimedia devices, such as, for example, cellular phones, digital video cameras and digital camcorders; (2) data processing devices, such as, for example, personal computers, laptops and personal digital assistants; and (3) consumer electronics, such as, for example, set top boxes, digital video disk (DVD) players and video network servers.

Without in any way limiting the scope, interpretation, or application of the claims appearing below, advantages of one or more of the exemplary embodiments disclosed herein include prediction of chroma residual samples for decreasing an energy associated with residual data utilized for encoding blocks of video data. The prediction of chroma residual samples is performed based on corresponding reconstructed luma residual samples and coefficients representing relation between reconstructed luma and chroma residual samples for encoded neighboring blocks. Further, the prediction of chroma residual samples is applicable to inter-prediction coding scheme thereby increasing an overall effectiveness of prediction of residual data, since a higher proportion of blocks are encoded based on inter-prediction coding scheme. Increasing an effectiveness of prediction decreases an energy associated with residual samples thereby improving compression efficiency and peak signal to noise ratio (PSNR) associated with the video data.

Although the present technology has been described with reference to specific exemplary embodiments, it is noted that various modifications and changes may be made to these embodiments without departing from the broad spirit and scope of the present technology. For example, the various devices, modules, analyzers, generators, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the various electrical structures and methods may be embodied using transistors, logic gates, and electrical circuits (for example, application specific integrated circuit (ASIC) circuitry and/or in Digital Signal Processor (DSP) circuitry).

Particularly, the system 200, the processing module 202 and the coding module 204 may be enabled using software and/or using transistors, logic gates, and electrical circuits (for example, integrated circuit circuitry such as ASIC circuitry). Various embodiments of the present disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. Additionally, a tangible data storage device may be embodied as one or more volatile memory devices, one or more non-volatile memory devices, and/or a combination of one or more volatile memory devices and non-volatile memory devices.

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled with each other but may still be indirectly coupled and in communication, whether electrically, mechanically, or otherwise, with one another. Other examples of changes, substitutions, and alterations ascertainable by one skilled in the art, upon or subsequent to studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology. Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:
1. A method, comprising:
  generating, with one or more processor circuits, a chroma prediction for encoding a block of video data;
  generating, with the one or more processor circuits, chroma residual samples for encoding the block of video data based on the chroma prediction and a chroma component corresponding to the block of video data;

generating, with the one or more processor circuits, predicted chroma residual samples for encoding the block of video data based on a linear model that specifies predicted chroma residual samples as a linear function of reconstructed luma residual samples;

generating, with the one or more processor circuits, chroma residual error samples based on the predicted chroma residual samples and the chroma residual samples; and encoding, with the one or more processor circuits, the video block based on the chroma residual error samples.

2. The method of claim 1, wherein the block of video data is configured to be encoded based on an inter-prediction coding scheme.

3. The method of claim 1, further comprising:
generating chroma residual error samples by subtracting the predicted chroma residual samples from chroma residual samples corresponding to the block of video data.

4. The method of claim 3, further comprising:
comparing a cost associated with the chroma residual error samples with a cost associated with the chroma residual samples for the block of video data; and
performing one of:
selecting a chroma residual prediction mode if the cost associated with the chroma residual error samples is less than the cost associated with the chroma residual samples, and
selecting a chroma prediction mode if the cost associated with the chroma residual samples is less than or equal to the cost associated with the chroma residual error samples.

5. The method of claim 4, further comprising:
performing one of:
encoding the block of video data based on the chroma residual error samples responsive to selection of the chroma residual prediction mode, and
encoding the block of video data based on the chroma residual samples responsive to selection of the chroma prediction mode.

6. The method of claim 4, wherein a metric for computing the cost associated with the chroma residual error samples and the cost associated with the chroma residual samples is one of sum of absolute differences, sum of squared differences, rate distortion optimization (RDO) and approximate RDO.

7. The method of claim 1, wherein the linear model specifies predicted chroma residual samples as a linear function of subsampled reconstructed luma residual samples, the method further comprising:
sub sampling the reconstructed luma residual samples to generate the subsampled reconstructed luma residual samples.

8. The method of claim 7, wherein the subsampling is performed based on a pre-defined chroma subsampling metric.

9. The method of claim 1, wherein the predicted chroma residual samples are generated for one of $C_b$ and $C_r$ chroma components corresponding to the block of video data, and wherein the predicted chroma residual samples are generated for remaining of the $C_b$ and $C_r$ chroma components based on the reconstructed luma residual samples and the predicted chroma residual samples generated for one of the $C_b$ and $C_r$ chroma components.

10. A system, comprising circuitry configured to:
generate a chroma prediction for encoding a block of video data;
generate chroma residual samples for encoding the block of video data based on the chroma prediction and a chroma component corresponding to the block of video data;
generate predicted chroma residual samples for encoding the block of video data based on a linear model that specifies predicted chroma residual samples as a linear function of reconstructed luma residual samples;
generate chroma residual error samples based on the predicted chroma residual samples and the chroma residual samples; and
encode the video block based on the chroma residual error samples.

11. The system of claim 10, wherein the circuitry is further configured to:
generate chroma residual error samples by subtracting the predicted chroma residual samples from chroma residual samples corresponding to the block of video data.

12. The system of claim 11, wherein the circuitry is further configured to:
compare a cost associated with the chroma residual error samples with a cost associated with the chroma residual samples for the block of video data; and
perform one of:
encoding the block of video data based on the chroma residual error samples if the cost associated with the chroma residual error samples is less than the cost associated with the chroma residual samples, and
encoding the block of video data based on the chroma residual samples if the cost associated with the chroma residual samples is less than or equal to the cost associated with the chroma residual error samples.

13. The system of claim 10, wherein the linear model specifies predicted chroma residual samples as a linear function of subsampled reconstructed luma residual samples, and wherein the circuitry is further configured to:
subsample the reconstructed luma residual samples to generate the subsampled reconstructed luma residual samples wherein the subsampling is performed based on a pre-defined chroma subsampling metric.

14. The system of claim 10, wherein the system is one of a high efficiency video coding (HEVC) based decoder, a moving picture experts group (MPEG)-4 based decoder, a HEVC based encoder and a MPEG-4 based encoder.

15. A non-transitory computer-readable medium comprising instructions that, when executed, cause the computer to:
generate a chroma prediction for encoding a block of video data;
generate chroma residual samples for encoding the block of video data based on the chroma prediction and a chroma component corresponding to the block of video data;
generate predicted chroma residual samples for encoding the block of video data based on a linear model that specifies predicted chroma residual samples as a linear function of reconstructed luma residual samples;
generate chroma residual error samples based on the predicted chroma residual samples and the chroma residual samples; and encode the video block based on the chroma residual error samples.

16. The non-transitory computer-readable medium of claim 15, wherein the instructions further cause the computer to:
generate chroma residual error samples by subtracting the predicted chroma residual samples from chroma residual samples corresponding to the block of video data;
compare a cost associated with the chroma residual error samples with a cost associated with the chroma residual samples for the block of video data; and
perform one of:
encoding the block of video data based on the chroma residual error samples if the cost associated with the chroma residual error samples is less than the cost associated with the chroma residual samples, and
encoding the block of video data based on the chroma residual samples if the cost associated with the chroma residual samples is less than or equal to the cost associated with the chroma residual error samples.

17. The non-transitory computer-readable medium of claim 15, wherein the linear model specifies predicted chroma residual samples as a linear function of subsampled reconstructed luma residual samples, and wherein the instructions further cause the computer to:
subsample the reconstructed luma residual samples to generate the subsampled reconstructed luma residual samples wherein the subsampling is performed based on a pre-defined chroma subsampling metric.

18. The method of claim 1, wherein generating the predicted chroma residual samples includes:
computing a coefficient based on reconstructed luma residual samples and corresponding reconstructed chroma residual samples for the block of video data, the linear model including the coefficient; and
generating the predicted chroma residual based on the linear model that includes the coefficient.

19. The system of claim 10, wherein the circuitry is further configured to:
compute a coefficient based on reconstructed luma residual samples and corresponding reconstructed chroma residual samples for the block of video data, the linear model including the coefficient; and
generate the predicted chroma residual based on the linear model that includes the coefficient.

20. The non-transitory computer-readable medium of claim 15, wherein the instructions that cause the computer to generate the predicted chroma residual samples include instructions that cause the computer to:
compute a coefficient based on reconstructed luma residual samples and corresponding reconstructed chroma residual samples for the block of video data, the linear model including the coefficient; and
generate the predicted chroma residual based on the linear model that includes the coefficient.

21. The method of claim 18, wherein the coefficient is computed responsive to determining a presence of at least one neighboring block encoded based on an inter-prediction coding scheme.

22. The method of claim 18, wherein the coefficient is obtained based on least mean square error metric.

23. The system of claim 19, wherein the coefficient is obtained based on least mean square error metric.

24. A method, comprising:
generating a chroma prediction for encoding a block of video data;
generating chroma residual samples for encoding the block of video data based on the chroma prediction and a chroma component corresponding to the block of video data;
generating predicted chroma residual samples for encoding the block of video data based on a linear model that specifies predicted chroma residual samples as a linear function of reconstructed luma residual samples;
generating chroma residual error samples based on the predicted chroma residual samples and the chroma residual samples; and
inter-encoding the video block based on the chroma residual error samples.

25. The method of claim 24, wherein the linear model specifies predicted chroma residual samples as a linear function of subsampled reconstructed luma residual samples.

* * * * *